(12) United States Patent  (10) Patent No.: US 12,540,156 B2
Moriyama  (45) Date of Patent: Feb. 3, 2026

(54) METHOD FOR PRODUCING NUCLEIC ACID OLIGOMER

(71) Applicant: SUMITOMO CHEMICAL COMPANY, LIMITED, Chuo-ku (JP)

(72) Inventor: Yuya Moriyama, Osaka (JP)

(73) Assignee: SUMITOMO CHEMICAL COMPANY, LIMITED, Chuo-ku (JP)

( * ) Notice: Subject to any disclaimer, the term of this patent is extended or adjusted under 35 U.S.C. 154(b) by 634 days.

(21) Appl. No.: 17/996,058

(22) PCT Filed: Mar. 31, 2021

(86) PCT No.: PCT/JP2021/014013
§ 371 (c)(1),
(2) Date: Oct. 12, 2022

(87) PCT Pub. No.: WO2021/210408
PCT Pub. Date: Oct. 21, 2021

(65) Prior Publication Data
US 2023/0192754 A1    Jun. 22, 2023

(30) Foreign Application Priority Data
Apr. 14, 2020 (JP) .................. 2020-072233

(51) Int. Cl.
C07H 21/02 (2006.01)
(52) U.S. Cl.
CPC .................. C07H 21/02 (2013.01)
(58) Field of Classification Search
CPC ...................................... C07H 21/02
USPC ...................................... 536/25.3
See application file for complete search history.

(56) References Cited

U.S. PATENT DOCUMENTS

| | | | |
|---|---|---|---|
| 6,008,379 A | 12/1999 | Benson et al. | |
| 6,160,109 A | 12/2000 | Just et al. | |
| 7,227,017 B2 | 6/2007 | Mellor et al. | |
| 2003/0153742 A1 | 8/2003 | Krotz et al. | |
| 2003/0229221 A1 | 12/2003 | Mellor et al. | |
| 2005/0208528 A1 | 9/2005 | Krotz et al. | |
| 2014/0309287 A1* | 10/2014 | Rusconi | A61P 9/00 514/44 R |
| 2018/0221404 A1 | 8/2018 | De Rosa et al. | |
| 2019/0350963 A1 | 11/2019 | Viaud et al. | |
| 2019/0390195 A1 | 12/2019 | Tondera et al. | |
| 2021/0277403 A1 | 9/2021 | Beigelman et al. | |

FOREIGN PATENT DOCUMENTS

| | | |
|---|---|---|
| CN | 101137662 A | 3/2008 |
| CN | 110678447 A | 1/2020 |
| JP | 7-170981 A | 7/1995 |
| JP | 2003-531827 A | 10/2003 |
| WO | WO 01/55160 A1 | 8/2001 |
| WO | WO 2017/068377 A1 | 4/2017 |
| WO | WO 2017/115652 A1 | 7/2017 |
| WO | WO 2018/141908 A1 | 8/2018 |

OTHER PUBLICATIONS

Andrus et al. Analysis and Purification of Synthetic Nucleic Acids Using HPLC. Current Protocols in Nucleic Acid Chemistry (2000) 10.5.1-10.5.13, p. 1-13. (Year: 2000).*
Li et al. Simultaneous separation of small interfering RNA and lipids using ion-pair reversed-phase liquid chromatography. Journal of Chromatography A, 1601 (2019) 145-154. Available online: Apr. 27, 2019. (Year: 2019).*
Machine English translation of foreign priority: Japan 2020-072233 filed on Apr. 14, 2020 (Year: 2020).*

(Continued)

Primary Examiner — Yih-Horng Shiao
(74) Attorney, Agent, or Firm — Oblon, McClelland, Maier & Neustadt, L.L.P.

(57) ABSTRACT

An object of the present invention is to provide a method for stabilizing a nucleic acid oligomer solution having a phosphorothioate bond, and a method for producing a purified nucleic acid oligomer. The present invention provides a method for stabilizing a nucleic acid oligomer, wherein an atmosphere in contact with an eluted fraction obtained by subjecting a crude nucleic acid oligomer containing a nucleic acid oligomer represented by Formula (1) (wherein symbols are as described in the specification) to a reverse-phase column chromatography treatment is set to an inert gas atmosphere having an oxygen concentration of 10% or less, and a method for producing a purified nucleic acid oligomer from the eluted fraction.

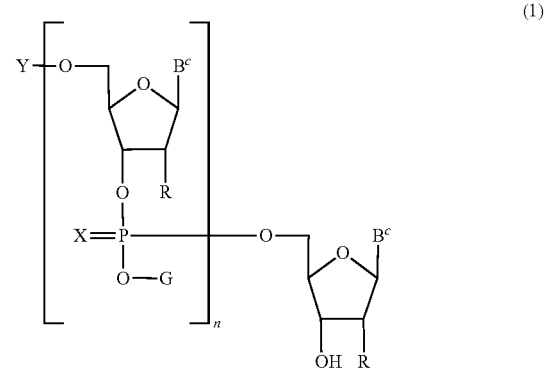

(1)

11 Claims, 1 Drawing Sheet
Specification includes a Sequence Listing.

(56) References Cited

OTHER PUBLICATIONS

Chinese Search Report issued Apr. 30, 2024 in Chinese Patent Application No. 202180027683.8, 2 pages.
Extended European Search Report issued May 22, 2024 in European Patent Application No. 21788621.7, 9 pages.
Kellner et al., "Oxidation of Phosphorothioate DNA modifications leads to lethal genomic instability", Nature Chemical Biology, vol. 13, No. 8, Aug. 1, 2017, pp. 888-894 (total 9 pages), XP055659682.
Iwamoto et al., "Control of Phosphorothioate Stereochemistry substantially increases the efficacy of antisense oligonucleotides", Nature Biotechnology, vol. 35, No. 9, Aug. 21, 2017, pp. 845-851 (total 11 pages), XP055566145.
International Search Report and Written Opinion issued Jun. 1, 2021, in PCT/JP2021/014013 (with English Translation), 12 pages.
Alexandre Goyon et al., "Characterization of therapeutic oligonucleotides by liquid Chromatography", Journal of Pharmaceutical and Biomedical Analysis 2020, 182, 113105, pp. 1-17.
Erb, R.; Leithner, K.; Bernkop-Schnürch, A.; Oberacher, H.Phosphorothicate Oligonucleotide Quantification by μ-LiquidChromatography-Mass Spectrometry.; AAPS J. 2012, 14 (4), 728-737. DOI.

\* cited by examiner

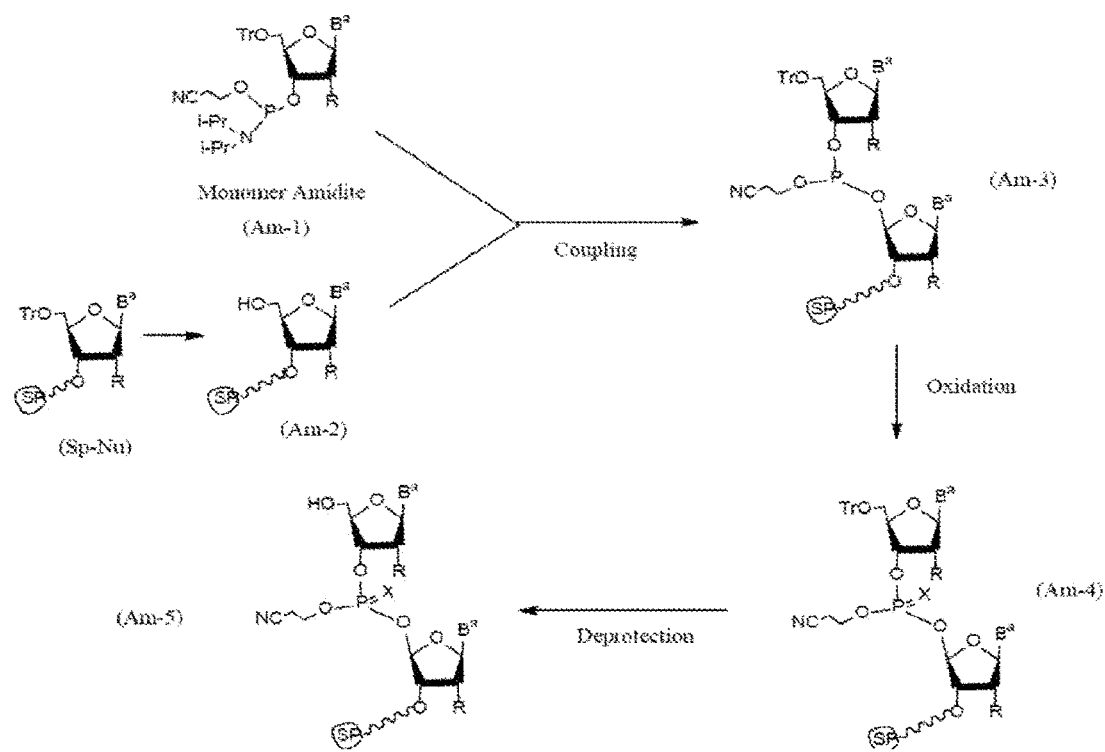

SEQUENCE LISTING

<160> NUMBER OF SEQ ID NOS: 2

<210> SEQ ID NO 1
<211> LENGTH: 103
<212> TYPE: RNA
<213> ORGANISM: Artificial Sequence
<220> FEATURE:
<223> OTHER INFORMATION: Synthetic oligonucleotide

<400> SEQUENCE: 1
auaacucaau uuguaaaaaa guuuuagagc uagaaauagc aaguuaaaau aaggcuaguc    60
cguuaucaac uugaaaaagu ggcaccgagu cggugcuuuu uuu                    103

<210> SEQ ID NO 2
<211> LENGTH: 67
<212> TYPE: RNA
<213> ORGANISM: Artificial Sequence
<220> FEATURE:
<223> OTHER INFORMATION: Synthetic oligonucleotide
<220> FEATURE:
<221> NAME/KEY: modified_base
<222> LOCATION: (4)..(4), (6)..(6), (14)..(14), (25)..(25), (37)..(37),
      (42)..(46)
<223> OTHER INFORMATION: am
<220> FEATURE:
<221> NAME/KEY: modified_base
<222> LOCATION: (2)..(2), (7)..(7), (22)..(22), (41)..(41), (47)..(47),
      (55)..(55), (61)..(61), (63)..(63)
<223> OTHER INFORMATION: gm
<220> FEATURE:
<221> NAME/KEY: modified_base
<222> LOCATION: (29)..(29), (38)..(38), (53)..(54)
<223> OTHER INFORMATION: cm
<220> FEATURE:
<221> NAME/KEY: modified_base
<222> LOCATION: (5)..(5), (39)..(40), (48)..(48), (62)..(62)
<223> OTHER INFORMATION: um
<220> FEATURE:
<221> NAME/KEY: modified_base
<222> LOCATION: (23)..(23), (28)..(28)
<223> OTHER INFORMATION: phosphorothioate derivative of cytosine
<220> FEATURE:
<221> NAME/KEY: modified_base
<222> LOCATION: (24)..(24), (27)..(27)
<223> OTHER INFORMATION: phosphorothioate derivative of uracil
<220> FEATURE:
<221> NAME/KEY: modified_base
<222> LOCATION: (26)..(26)
<223> OTHER INFORMATION: phosphorothioate derivative of guanine
<220> FEATURE:
<221> NAME/KEY: modified_base
<222> LOCATION: (1)..(1)
<223> OTHER INFORMATION: phosphorothioate derivative of
      2'-O-methyladenosine
<220> FEATURE:
<221> NAME/KEY: modified_base
<222> LOCATION: (2)..(2)
<223> OTHER INFORMATION: phosphorothioate derivative of
      2'-O-methyllguanosine
<220> FEATURE:
<221> NAME/KEY: modified_base
<222> LOCATION: (3)..(3), (64)..(64)
<223> OTHER INFORMATION: phosphorothioate derivative of
      2'-O-methyllcytidine
<220> FEATURE:
<221> NAME/KEY: modified_base
<222> LOCATION: (65)..(66)
<223> OTHER INFORMATION: phosphorothioate derivative of
      2'-O-methylluridine

```
<400> SEQUENCE: 2
nnnnnnncaa guunaaauaa gnnnnnnnng uuaucannnn nnnnnnnngg cannnagucg    60 nnnnnnu                                                             67
```

METHOD FOR PRODUCING NUCLEIC ACID OLIGOMER

CROSS-REFERENCE TO RELATED APPLICATIONS

The present application is a 35 U.S.C. § 371 national stage patent application of International patent application PCT/JP2021/014013, filed on Mar. 31, 2021, which is based on and claims the benefits of priority to Japanese Application No. 2020-072233, filed on Apr. 14, 2020. The entire contents of these applications are incorporated herein by reference.

TECHNICAL FIELD

This patent application claims the benefit of priority from the Paris Convention based on Japanese Patent Application No. 2020-072233 (filed on Apr. 14, 2020), the entire contents of which are incorporated herein by reference.

The present invention relates to a method for producing a nucleic acid oligomer. The present invention more particularly relates to a method for producing a nucleic acid oligomer containing phosphorothioate.

BACKGROUND ART

In recent years, there is an increasing interest in the application of nucleic acid oligomers to the medical field. For example, antisense nucleic acids, aptamers, ribozymes, and nucleic acids that induce RNA interference (RNAi) such as siRNAs, are referred to as nucleic acid pharmaceuticals.

A nucleic acid oligomer can be synthesized by solid-phase synthesis, and a nucleic acid oligomer synthesized by elongating a nucleic acid on a solid support is cleaved from the solid support, and then a protecting group of a hydroxy group at the 2'-position of ribose is removed by deprotection of the hydroxy group of the nucleic acid oligomer containing ribose, to produce a target nucleic acid oligomer. Nucleic acid oligomers having a phosphorothioate bond are also known as useful compounds (Patent Document 1).

PRIOR ART DOCUMENT

Patent Document

Patent Document 1: WO 2017/068377 A

SUMMARY OF THE INVENTION

Problems to be Solved by the Invention

A nucleic acid oligomer having a phosphorothioate bond may have a problem of stability as compared with a nucleic acid oligomer including only phosphodiester bonds. An object of the present invention is to provide a method for stabilizing a nucleic acid oligomer having a phosphorothioate bond, and a method for efficiently producing the nucleic acid oligomer, the method including a step of isolating the nucleic acid oligomer stabilized by the method.

Means for Solving the Problems

As a result of intensive studies to achieve the above object, the present inventors have found that a crude product of a nucleic acid oligomer having a phosphorothioate bond, which is produced by a phosphoramidite method, is subjected to reverse-phase column chromatography, to obtain a purified eluted fraction containing the nucleic acid oligomer, and then an atmosphere in contact with the obtained eluted fraction is set to an inert gas atmosphere of a certain concentration or less, whereby a nucleic acid oligomer having the phosphorothioate bond can be stabilized. The present invention provides a method for stabilizing a nucleic acid oligomer having a phosphorothioate bond, and a method for efficiently producing a nucleic acid oligomer having a phosphorothioate bond, the method including a step of isolating the nucleic acid oligomer stabilized by the method.

The present invention includes, but is not limited to, the following aspects.

Item 1. A method for stabilizing a nucleic acid oligomer, wherein an atmosphere in contact with a solution containing a nucleic acid oligomer represented by Formula (1) is set to an inert gas atmosphere having an oxygen concentration of 10% or less, the nucleic acid oligomer being an eluted fraction obtained by reverse-phase column chromatography.

[Chemical Formula 1]

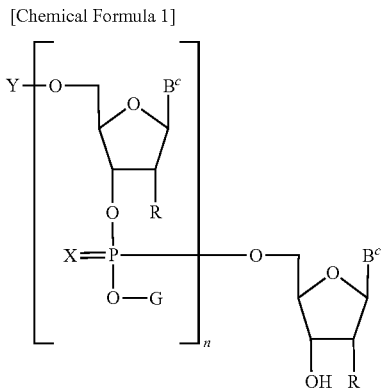

(1)

In Formula (1), $B^C$ is the same or different and each independently represents a nucleobase, R is the same or different and each independently represents a hydrogen atom, a fluorine atom, or an OQ group, Q is the same or different and each independently represents a hydrogen atom, a methyl group, a 2-methoxyethyl group, a methylene group bonded to a carbon atom at the 4'-position of ribose, an ethylene group bonded to a carbon atom at the 4'-position of ribose, or an ethylidene group bonded to a carbon atom at the 4'-position of ribose, X is the same or different and each independently represents an oxygen atom or a sulfur atom, Y represents a hydrogen atom or a protecting group of a hydroxy group, G represents an ammonium ion, an alkylammonium ion, an alkali metal ion, a hydrogen ion, or a hydroxyalkylammonium ion, n is an integer satisfying Formula (2):

60≤n (2)

and up to 20% of n Xs are sulfur atoms.

Item 2. A method for producing a stabilized purified nucleic acid oligomer solution, the method including the steps of: subjecting a crude product of the nucleic acid oligomer represented by Formula (1) produced by a phosphoramidite method to reverse-phase column chromatography, to obtain a purified eluted fraction containing the nucleic acid oligomer of Formula (1); and setting an atmosphere in contact with the eluted fraction described in the item 1 to an inert gas atmosphere having an oxygen concentration of 10% or less.

Item 3. A method for producing a purified nucleic acid oligomer, the method further including the steps of: producing a purified nucleic acid oligomer solution by the steps described in the item 2; and isolating a purified nucleic acid oligomer from the purified nucleic acid oligomer solution.

Item 4. The method according to any one of the items 1 to 3, wherein the oxygen concentration is 5% or less.

Item 5. The method according to any one of the items 1 to 4, wherein the oxygen concentration is 2.5% or less.

Item 6. The method according to any one of the items 2 to 5, wherein the reverse-phase column chromatography is reverse-phase column chromatography using, as a mobile phase, a mobile phase containing at least one ammonium salt selected from the group consisting of monoalkylammonium salts and dialkylammonium salts.

Item 7. The method according to any one of the items 2 to 6, wherein the reverse-phase column chromatography is reverse-phase column chromatography using, as a mobile phase, a mobile phase containing at least one ammonium salt selected from the group consisting of dialkylammonium salts.

Item 8. The method according to any one of the items 2 to 7, wherein the reverse-phase column chromatography is reverse-phase column chromatography using, as a mobile phase, a mobile phase containing at least one water-soluble organic solvent selected from the group consisting of alcohol-based water-soluble organic solvents and nitrile-based water-soluble organic solvents.

Item 9. The method according to the item 3, including mixing the stabilized purified nucleic acid oligomer solution with a C1-C4 organic solvent having at least one oxygen atom to isolate a precipitated nucleic acid oligomer.

Item 10. The method according to any one of the items 1 to 9, wherein in Formula (1), R is each independently a hydroxy group or a methoxy group.

Item 11. The production method according to any one of the items 2 to 9, wherein R is a hydroxy group.

The present invention further includes, but is not limited to, the following aspects.

Item 1A. A method for producing a nucleic acid oligomer, the method including the steps of:

subjecting a crude product of a nucleic acid oligomer represented by Formula (1) produced by a phosphoramidite method to reverse-phase column chromatography, to obtain a purified eluted fraction containing the nucleic acid oligomer of Formula (1); and setting an atmosphere in contact with the eluted fraction to an inert gas atmosphere having an oxygen concentration of 10% or less, to obtain a stabilized purified nucleic acid oligomer solution.

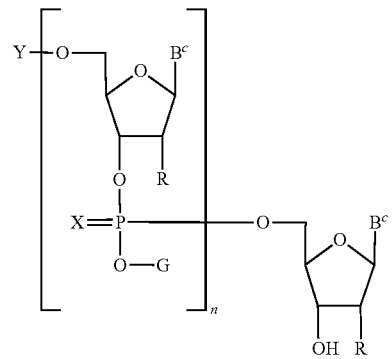

[Chemical Formula 2]

(1)

In Formula (1), $B^C$ is the same or different and each independently represents a nucleobase, R is the same or different and each independently represents a hydrogen atom, a fluorine atom, or an OQ group, Q is the same or different and each independently represents a hydrogen atom, a methyl group, a 2-methoxyethyl group, a methylene group bonded to a carbon atom at the 4'-position of ribose, an ethylene group bonded to a carbon atom at the 4'-position of ribose, or an ethylidene group bonded to a carbon atom at the 4'-position of ribose, X is the same or different and each independently represents an oxygen atom or a sulfur atom, Y represents a hydrogen atom or a protecting group of a hydroxy group, G represents an ammonium ion, an alkylammonium ion, an alkali metal ion, a hydrogen ion, or a hydroxyalkylammonium ion, n is an integer satisfying Formula (2):

$60 \leq n$ (2)

and up to 20% of n Xs are sulfur atoms.

Item 2A. The method for producing a nucleic acid oligomer according to the item 1A, the method further including the step of isolating a purified nucleic acid oligomer from the stabilized purified nucleic acid oligomer solution.

Item 3A. The method for producing a nucleic acid oligomer according to the item 1A or 2A, wherein the oxygen concentration is 5% or less.

Item 4A. The method for producing a nucleic acid oligomer according to the item 1A or 2A, wherein the oxygen concentration is 2.5% or less.

Item 5A. The production method according to any one of the items 1A to 4A, wherein a mobile phase of the reverse-phase column chromatography is a mobile phase containing at least one ammonium salt selected from the group consisting of monoalkylammonium salts and dialkylammonium salts.

Item 6A. The production method according to any one of the items 1A to 4A, wherein a mobile phase of the reverse-phase column chromatography is a mobile phase containing at least one ammonium salt selected from the group consisting of dialkylammonium salts.

Item 7A. The production method according to any one of the items 1A to 6A, wherein the reverse-phase column chromatography is reverse-phase column chromatography using, as a mobile phase, a mobile phase containing at least one water-soluble organic solvent selected from the group consisting of alcohol-based water-soluble organic solvents and nitrile-based water-soluble organic solvents.

Item 8A. The production method according to the item 2A, including mixing the stabilized purified nucleic acid oligomer solution with a C1-C4 organic solvent having at least one oxygen atom, to isolate a precipitated nucleic acid oligomer.

Item 9A. The production method according to any one of the items 1A to 8A, wherein in Formula (1), R is each independently a hydroxy group or a methoxy group.

Item 10A. The production method according to any one of the items 1A to 8A, wherein R is a hydroxy group.

Item 11 A. A method for stabilizing a nucleic acid oligomer, wherein an atmosphere in contact with a solution containing a nucleic acid oligomer represented by Formula (1) is set to an inert gas atmosphere having an oxygen concentration of 10% or less, the nucleic acid oligomer being an eluted fraction obtained by reverse-phase column chromatography.

[Chemical Formula 3]

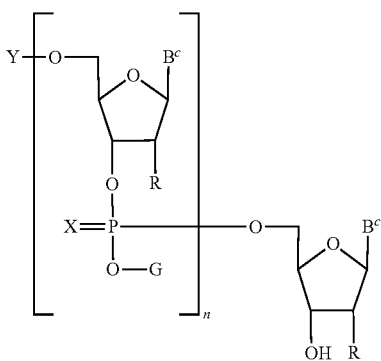

(1)

In Formula (1), definition of each group is as defined in the item [1A].

Effect of the Invention

According to the present invention, a nucleic acid oligomer having a phosphorothioate bond is stabilized, and a method for efficiently producing the nucleic acid oligomer is provided.

BRIEF DESCRIPTION OF THE DRAWING

FIG. 1 is a view showing an example of synthesis of a nucleic acid oligomer by a phosphoramidite method.

MODE FOR CARRYING OUT THE INVENTION

A method for stabilizing a nucleic acid oligomer will be described wherein an atmosphere in contact with a solution containing a nucleic acid oligomer represented by Formula (1) is an inert gas atmosphere having an oxygen concentration of 10% or less, the nucleic acid oligomer being an eluted fraction obtained by reverse-phase column chromatography.

In Formula (1), the nucleobase represented by $B^C$ (hereinafter, it may be referred to as a "base") may be a natural or non-natural nucleobase. Such a non-natural nucleobase includes modified analogs of natural or non-natural nucleobases. As the nucleobase, purine compounds and pyrimidine compounds are typically exemplified, and examples thereof include nucleobases disclosed in U.S. Pat. No. 3,687,808, "Concise Encyclopedia of Polymer Science and Engineering", page 858 to 859, edited by Kroschwitz J. I., John Wiley & Sons, 1990, and Englisch et al., Angewandte Chemie, International Edition, Vol. 1991, 30, page 613.

Specific examples thereof include purine bases such as adenine, isoguanine, xanthine, hypoxanthine, and guanine; and pyrimidine bases such as cytosine, uracil, and thymine.

Further, examples of the nucleobase represented by $B^C$ include amino derivatives such as 2-aminoadenine, 2-aminopurine, and 2,6-diaminopurine; alkyl derivatives such as 5-methyluracil, 5-methylcytosine, 7-methylguanine, 6-methylpurine, and 2-propylpurine; 5-halouracil and 5-halocytosine; 5-propynyluracil and 5-propynylcytosine; 6-azauracil, 6-azacytosine, and 6-azathimine; 5-uracil (pseudouracil), 4-thiouracil, 5-(2-aminopropyl)uracil, 5-aminoallyluracil; 8-halogenated, aminated, thiolated, thioalkylated, hydroxylated, and other 8-substituted purines; 5-trifluoromethylated and other 5-substituted pyrimidines; 6-azapyrimidine; N-2, N-6, and O-6 substituted purines (including 2-aminopropyl adenine); dihydrouracil; 3-deaza-5-azacytosine; 7-deazaadenine; N6-methyladenine, N6,N6-dimethyladenine; 5-amino-allyl-uracil; N3-methyluracil; substituted 1,2,4-triazole; 2-pyridinone; 5-nitroindole; 3-nitropyrrole; 5-methoxyuracil; uracil-5-oxyacetic acid; 5-methoxycarbonylmethyluracil; 2-thiouracil, 5-methyl-2-thiouracil; 5-methoxycarbonylmethyl-2-thiouracil; 5-methylaminomethyl-2-thiouracil; 3-(3-amino-3-carboxypropyl) uracil; 3-methylcytosine; N4-acetylcytosine; 2-thiocytosine; N6-methyladenine; N6-isopentyladenine; 2-methylthio-N6-isopentenyladenine; N-methylguanine; and O-alkylated bases.

When R represents an OQ group, and Q represents a methylene group bonded to a carbon atom at the 4'-position of ribose, an ethylene group bonded to a carbon atom at the 4'-position of ribose, or an ethylidene group bonded to a carbon atom at the 4'-position of ribose, the structure is represented by the structures of LNA-1, LNA-2, and LNA-3 shown in Formula (3) below:

[Chemical Formula 4]

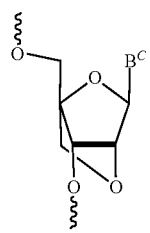

LNA-1

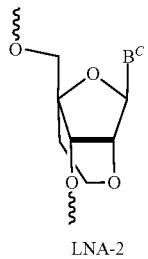

LNA-2

(3)

-continued

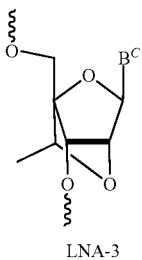

LNA-3

In the formulas, B° represents a nucleobase as described above.

The protecting group of a hydroxy group, which is represented by Y, can be used without particular limitation as long as it can function as a protecting group in an amidite method, and for example, a known protecting group used for an amidite compound can be widely used. The protecting group of a hydroxy group, which is represented by Y, is preferably the following group:

[Chemical Formula 5]

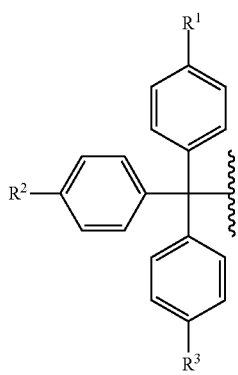

In the formula, $R^1$, $R^2$, and $R^3$ are the same or different and each independently represent a hydrogen or an alkoxy group.

Examples of the alkoxy group include a methoxy group.

The chain length of the nucleic acid oligomer of Formula (1) is, for example, $n \geq 60$, $n \geq 80$, or $n \geq 100$. The upper limit of the chain length is, for example, $n \leq 200$. In the nucleic acid oligomer, up to 20% (including 20%) of n Xs are sulfur atoms. The nucleic acid oligomer of Formula (1) preferably has one or more phosphorothioate bonds, more preferably three or more phosphorothioate bonds.

The nucleic acid oligomer of Formula (1) may be, for example, a DNA or RNA oligomer, or a DNA or RNA oligomer including a non-natural nucleobase. The nucleic acid oligomer is typically a single-stranded DNA or RNA oligomer. In the nucleic acid oligomer of Formula (1), the substituent R is preferably each independently a hydroxy group or a methoxy group. The method of the present invention is suitable for RNA which is a nucleic acid oligomer of Formula (1), wherein the substituent R is each independently a hydroxy group or a methoxy group. More specifically, the method of the present invention is suitable for the production of a nucleic acid oligomer containing both a nucleotide including a hydroxy group as the substituent R, and a nucleotide including a methoxy group as the substituent R.

<Method for Purifying Nucleic Acid Oligomer by Reverse-Phase Column Chromatography>

The separation by reverse-phase column chromatography is performed by passing a mobile phase containing an alkylammonium salt through a column containing a packing material; then passing a solution obtained by dissolving a reaction product containing a nucleic acid oligomer synthesized by a phosphoramidite method in the mobile phase through the column; and causing the nucleic acid oligomer to be adsorbed and bonded to the inside of the column, thereby separating impurities contained in the nucleic acid oligomer and a target nucleic acid molecule through gradient elution involving sequentially increasing an organic solvent concentration in the mobile phase, and thus eluting the target nucleic acid molecule.

The eluted fraction obtained by reverse-phase column chromatography is selected and collected by analyzing the composition with UV absorption at a wavelength of 260 nm under the conditions of chromatography generally used for separation analysis of nucleic acids. From the collected fraction, nucleic acid oligomers having a predetermined amount of phosphorothioate bonds, which are purified target objects, are obtained. As the analysis method, for example, the method described in Non-Patent Document (Handbook of Analysis of Oligonucleotides and Related Products, CRC Press) can be used.

Examples of the packing material for reverse-phase column chromatography include silica or a polymer serving as a hydrophobic stationary phase, in which any one or more selected from a phenyl group, an alkyl group having 1 to 20 carbon atoms, and a cyanopropyl group are immobilized. As the silica or polymer as such a packing material, for example, one having a particle diameter of 2 μm or more, or 5 μm or more is used.

A fraction liquid eluted in the reverse-phase column chromatography is a water-soluble mobile phase. Examples of a solvent system to be the mobile phase include an alcohol-based organic solvent (for example, methanol, ethanol, 2-propanol, or n-propanol), a nitrile-based organic solvent (for example, acetonitrile), and water. The alcohol-based organic solvent is preferably a C1 to C3 alcohol, and more preferably methanol. The nitrile-based organic solvent is preferably acetonitrile. The organic solvent may be used alone, or in combination of two or more types.

The mobile phase of the reverse-phase column chromatography usually contains an alkylammonium salt, and the eluent also contains these alkylammonium salts. As the alkylammonium salts, monoalkylammonium salts, dialkylammonium salts, and trialkylammonium salts are usually used, and monoalkylammonium salts and dialkylammonium salts are preferably used, and dialkylammonium salts are more preferably used. The number of carbon atoms of the monoalkylamine forming the monoalkylammonium salt is preferably 3 to 10, more preferably 4 to 6, and still more preferably, the monoalkylamine is hexylamine. The number of carbon atoms of the dialkylamine forming the dialkylammonium salt is preferably 4 to 10 and more preferably 5 to 9. A preferred dialkylamine is dibutylamine. The trialkylamine forming the trialkylammonium salt is preferably one having 6 to 12 carbon atoms, more preferably one having 6 to 9 carbon atoms, and is specifically triethylamine, for example.

Examples of the acid forming the monoalkylammonium salt, the dialkylammonium salt, and the trialkylammonium salt include carbonic acid, acetic acid, formic acid, trifluoroacetic acid, and propionic acid.

The concentration of the ammonium salt is usually 1 to 200 mM, preferably 5 to 150 mM, and more preferably 20 to 100 mM.

The pH of the mobile phase usually ranges from 6 to 8, preferably from 6.5 to 7.5.

The temperature of the reverse-phase column chromatography is usually 20 to 100° C., preferably 30 to 80° C., and more preferably 40 to 70° C.

The elution fraction obtained by reverse-phase column chromatography usually contains water, an alcohol-based organic solvent, a nitrile-based organic solvent, the alkylammonium salt, and the nucleic acid oligomer of Formula (1). The amount of water in the eluent is usually 90% to 30%, preferably 80% to 40%, and more preferably 70% to 40%. The amount of the alcohol-based organic solvent in the eluent is usually 0 to 20%, preferably 0 to 15%, and more preferably 0% to 10%. The amount of the nitrile-based organic solvent in the eluent is usually 10 to 70%, preferably 20 to 60%, and more preferably 30 to 50% (all of the above percentages represent mass %).

The molar concentration of the alkylammonium salt in the eluted fraction is usually 1 mM to 200 mM, and preferably 10 mM to 100 mM.

The concentration of the nucleic acid oligomer in the eluted fraction is usually 0.05 mg/mL to 5 mg/mL, preferably 0.05 mg/mL to 1 mg/mL, and more preferably 0.1 mg/mL to 0.5 mg/mL. sv<Step of Stabilizing Eluted Fraction Containing Nucleic Acid Oligomer Obtained by Reverse-Phase Chromatography>

The inert gas atmosphere having an oxygen concentration of 10% or less may be adjusted, for example, by supplying an inert gas having a predetermined oxygen concentration or less to a container including a nucleic acid oligomer therein, and measuring and confirming that the oxygen concentration in the atmosphere in the container is within the set concentration range. Specifically, the oxygen concentration can be adjusted by circulating a high purity inert gas such as argon or nitrogen, or an inert gas whose oxygen concentration has been prepared to a predetermined concentration in the atmosphere in the container, or replacing the atmosphere in the container with the inert gas or inert gas whose concentration has been adjusted.

The preparation of the inert gas atmosphere having an oxygen concentration of 10% or less may be performed at any stage before, during, or after the eluted fraction is supplied to the container. In addition, adjustments at these different timings may be combined.

Examples of the inert gas include, but are not limited to, nitrogen gas, argon gas, and helium gas.

Examples of the atmosphere replacement method in the container include vacuum replacement, pressure replacement, flow replacement, replacement by bubbling, and replacement by freeze-deaeration. In the atmosphere replacement, ultrasonic waves may be applied, or heating may be performed. A more preferred method is flow replacement.

The oxygen concentration under the inert gas atmosphere is preferably 10% or less, more preferably 5.0% or less, still more preferably 2.5% or less, and even still more preferably 0.1% or less.

Under the inert gas atmosphere, the eluted fraction obtained may be stored usually from 0° C. to 80° C., preferably from 10° C. to 70° C., more preferably from 20° C. to 60° C.

The eluted fraction containing the nucleic acid oligomer, obtained by reverse-phase chromatography may be subjected to a single step or a plurality of steps selected from post-treatment steps such as a reprecipitation step, a liquid separation step, an ultrafiltration step, a deprotection step, and a lyophilization step, for isolating the nucleic acid oligomer after storage, for example.

In the reprecipitation step, the stabilized solution can be brought into contact with a poor solvent to precipitate and isolate nucleic acid oligomers. If necessary, the liquid part may be removed from the solid-liquid separated state, and then the precipitated nucleic acid oligomers may be collected and isolated by filtration or the like. Examples of the poor solvent in the reprecipitation step include C1-C4 organic solvents having at least one oxygen atom (for example, C1-C4 alcohols, tetrahydrofuran, dioxane). As such a solvent, ethanol or isopropanol is preferable.

In the liquid separation step, at least one of an acidic aqueous solution such as an aqueous sodium acetate solution, water, a saline solution, and the like is mixed with the stabilized solution, and an organic solvent that is not miscible with water is further added to the stabilized solution, to thereby separate the solution into an aqueous layer and an organic layer, so that an aqueous layer containing a desired nucleic acid oligomer can be obtained.

In the ultrafiltration step, the nucleic acid oligomer present in the solution after the storage step can be separated from low molecular weight components having a molecular weight equal to or lower than a desired molecular weight, by using an ultrafiltration membrane.

When there is a protecting group at the 5T-end site of the nucleic acid oligomer, in order to deprotect the protecting group, the protecting group of the nucleic acid oligomer can be deprotected by mixing an acidic aqueous solution such as an aqueous acetic acid solution or a solution obtained by dissolving an acidic substance such as acetic acid in an organic solvent with the solution after the storage step.

In the lyophilization step, water is sublimated by depressurizing the aqueous solution of a frozen nucleic acid oligomer, whereby the nucleic acid oligomer and water can be separated.

In the synthesis of the nucleic acid oligomer by a phosphoramidite method, a nucleic acid elongation reaction can be performed according to a known method (for example, the method described in JP-B-5157168 or JP-B-5554881). Regarding the production of a nucleic acid oligomer by a phosphoramidite method, a method for producing a nucleic acid oligomer will be described with reference to the following reaction pathway (coupling, oxidation, deprotection), taking the synthesis of RNA of the scheme shown in FIG. 1 as an example.

In the chemical formula showing the reaction pathway, Ba represents a nucleobase which may be protected; Tr represents a protecting group; X is as defined above; and SP represents a portion other than the nucleoside structure of the inorganic porous support.

The nucleobase constituting the nucleoside of the inorganic porous support (Sp-Nu) and the amidite monomer (Am-1), which have a nucleoside structure, is a nucleobase or a nucleobase protected with a protecting group as described above.

Examples of suitable amidite monomers (Am-1) include compounds represented by Chemical Formula (Am-1') below, wherein when R represents a hydroxy group protected by a protecting group, the protecting group is specifically a tert-butyldimethylsilyl (TBDMS) group, a bis(2-acetoxy)methyl (ACE) group, a (triisopropylsilyloxy) methyl (TOM) group, a (2-cyanoethoxy)ethyl (CEE) group, a (2-cyanoethoxy)methyl (CEM) group, a para-tolylsulfonylethoxymethyl (TEM) group, a (2-cyanoethoxy) methoxymethyl (EMM) group, and the like. Specific examples of the amidite monomers include TBDMS amidite (TBDMS RNA amidites, trade name, ChemGenes Corporation), ACE amidite, TOM amidite, CEE amidite, CEM amidite, TEM amidite (review of Chakhmakhcheva: Protective Groups in the Chemical Synthesis of Oligoribonucleotides, Russian Journal of Bioorganic Chemistry, 2013, Vol. 39, No. 1, pp. 1 to 21), and EMM amidite (described in WO 2013/027843), which are protected by the above protecting groups and the like.

[Chemical Formula 6]

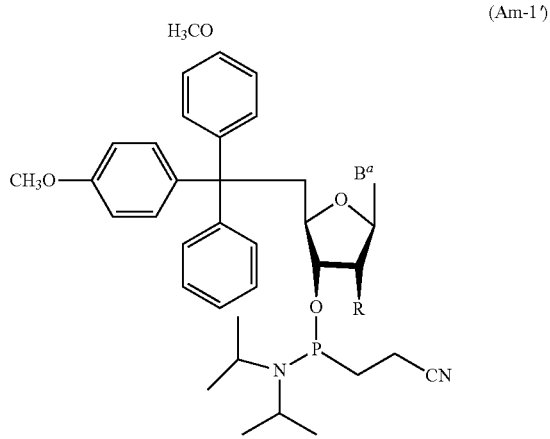

(Am-1')

In the formula, R represents a group as described above, and $B^a$ represents a nucleobase which may be protected.

[Solid-Phase Synthesis of RNA]

The Tr group of the inorganic porous support (Sp-Nu) is deprotected to obtain a solid support (Am-2). Thereafter, the amidite monomer (Am-1) and the solid support (Am-2) are subjected to a coupling reaction to obtain a reaction product (Am-3). Thereafter, the reaction product (Am-3) is oxidized to obtain a product (Am-4). Thereafter, the product (Am-4) is deprotected (-Tr) to obtain a product (Am-5). Next, the amidite monomer (Am-1) and the product (Am-5) are further subjected to a coupling reaction to elongate the phosphodiester bond. As described above, the hydroxyl group at the 5'-position of the elongated oligonucleotide strand is treated with a series of cycles of deprotection, coupling reaction, and oxidation repeatedly as necessary in order to obtain the desired sequence. Then, the resulting product is cleaved from the solid support, and a nucleic acid molecule having a desired sequence can be thus produced. Such synthesis may be performed using an automated nucleic acid synthesizer employing a phosphoramidite method or the like. Here, RNA will be described as an example, but the present invention can also be applied to a nucleic acid compound containing nucleotides other than ribonucleotides.

In the step of deprotecting the Tr group, the protecting group of the hydroxy group at the 5'-position of the end of the RNA strand supported on the solid support is deprotected. As the protecting group, a trityl-based protecting group (typically, a DMTr group) is used. Deprotection can be performed using an acid. Examples of the acid for deprotection include trifluoroacetic acid, trichloroacetic acid, dichloroacetic acid, trifluoromethanesulfonic acid, methanesulfonic acid, hydrochloric acid, acetic acid, and p-toluenesulfonic acid.

In the coupling step, nucleoside phosphoramidite is bonded to the hydroxy group at the 5'-position of the end of the RNA strand deprotected in the deprotection step, to produce a phosphite. As the nucleoside phosphoramidite, one in which the hydroxy group at the 5'-position is protected with a protecting group (for example, a DMTr group) is used.

In addition, the coupling step can be performed using an activator that activates the nucleoside phosphoramidite. Examples of the activator include 5-benzylthio-1H-tetrazole (BTT), 1H-tetrazole, 4,5-dicyanoimidazole (DCI), 5-ethylthio-1H-tetrazole (ETT), N-methylbenzimidazolium triflate (N-MeBIT), benzimidazolium triflate (BIT), N-phenylimidazolium triflate (N-PhIMT), imidazolium triflate(IMT), 5-nitrobenzimidazolium triflate (NBT), 1-hydroxybenzotriazole (HOBT), and 5-(bis-3,5-trifluoromethylphenyl)-1H-tetrazole (Activator-42).

After the coupling step, the unreacted hydroxy group at the 5'-position may be capped as appropriate. Capping can be performed using a known capping solution such as an acetic anhydride-tetrahydrofuran solution or a phenoxyacetic anhydride/N-methylimidazole solution.

The oxidation step is a step of oxidizing the phosphite formed by the coupling step. The oxidation step can be performed using an oxidizing agent. Examples of the oxidizing agent include iodine, m-chloroperbenzoic acid, tert-butyl hydroperoxide, 2-butanone peroxide, bis(trimethylsilyl)peroxide, 1,1-dihydroperoxycyclododecane, and hydrogen peroxide.

In the case of converting a phosphite triester group into a thiophosphate triester group, for example, sulfur, 3H-1,2-benzodithiol-3-one-1,1-dioxide (Beaucage reagent), 3-amino-1,2,4-dithiazole-5-thione (ADTT), 5-phenyl-3H-1,2,4-dithiazole-3-one (POS), [(N,N-dimethylaminomethylidene)amino]-3H-1,2,4-dithiazoline-3-thione (DDTT), and phenyl acetyl disulfide (PADS) can be used as the "oxidizing agent". The oxidizing agent can be used by being diluted with an appropriate solvent so as to have a concentration of 0.001 to 2 M. The solvent used in the reaction is not particularly limited as long as it is not involved in the reaction, and examples thereof include dichloromethane, acetonitrile, pyridine, or a mixed solvent in any ratio thereof.

The oxidation step may be performed after the capping operation, or conversely, the capping operation may be performed after the oxidation step, and the order is not limited.

After the oxidation step, the process returns to the deprotection step, and a series of steps of the coupling reaction, oxidation, and deprotection described above is repeated according to the nucleotide sequence of the nucleic acid oligomer to be synthesized, whereby RNA having a desired sequence can be synthesized.

After the synthesis of the nucleic acid oligomer having a desired sequence is completed, the RNA strand is cleaved from the solid support by using ammonia or an amine compound, and recovered.

Examples of the amine compound here include methylamine, ethylamine, isopropylamine, ethylenediamine, diethylamine, and triethylamine.

The chain length of the nucleic acid oligomer thus obtained is, for example, $n \geq 60$, $n \geq 80$ or $n \geq 100$, and $n \leq 200$.

In the step of deprotecting the phosphate protecting group, after the synthesis of the nucleic acid having a desired sequence is completed, an amine compound is allowed to act in order to deprotect the protecting group of the phosphate moiety. Examples of the amine compound include diethylamine as described above.

When there is a protecting group of a hydroxy group at the 2'-position or the 3'-position of ribose, the protecting group can be removed according to the method described in WO 2006/022323 A, WO 2013/027843 A, or WO 2019/208571 A.

EXAMPLES

Hereinafter, the present invention will be described in more detail with reference to Examples, but the present invention is not limited to these examples.

Measurement Method

The measurement methods used in the following tests are shown below.

(Measurement Method 1: Method for Measuring Purity of RNA)

The purity of RNA in the fraction solution eluted by reverse-phase chromatography was measured by high-performance liquid chromatography (HPLC). The fractionated RNA was separated into components by HPLC (wavelength: 260 nm, column: DNAPacTM PA 200, 4.0 mm×250 mm, 8.0 μm), and the purity of RNA was calculated from the area value of the main product in the total area value of the obtained chromatogram. The HPLC measurement conditions are shown in Table 1 below.

TABLE 1

| Column | DNAPac ™ PA200, 4.0 mm × 250 mm, 8.0 μm |
|---|---|
| Flow rate | 1.0 mL/min |
| Detection wavelength | 260 nm |
| Mobile phase A | 25 mM Tris-HCl buffer (pH 8.0) (containing 10% acetonitrile and 6M urea) |
| Mobile phase B | 25 mM Tris-HCl buffer (pH 8.0) (containing 500 mM sodium perchlorate, 10% acetonitrile, and 6M urea) |
| Gradient condition | B conc. 20%(0 min)-60%(60 min)-90%(60.01 min)-90%(65 min)-20%(65.01 min)-20%(80 min) |
| Column temperature | 80° C. |

(Measurement Method 2: Measurement of Oxygen Concentration)

The oxygen concentration of the atmosphere in contact with the fraction solution eluted by reverse-phase chromatography was measured using PACK KEEPER (residual oxygen meter) manufactured by Iijima Electronics Corporation. Before measuring the oxygen concentration, the apparatus was calibrated by measuring the oxygen concentrations in the air and pure nitrogen. Then, a needle attached to the apparatus was pierced into a container such as a flask covered with a septum or the like, and the oxygen concentration in the gas phase portion of the system was measured. The measured value of the oxygen concentration was displayed in real time, and a value at which the measured value had stabilized was taken as the oxygen concentration of the atmosphere.

Reference Example 1

Solid-Phase Synthesis of RNA by Amidite Method

An RNA having the following nucleic acid sequence of I was synthesized. The RNA strand consists of 103 bases in length.

Strand I:
(SEQ ID NO: 1)
A*U*A*ACUCAAUUUGUAAAAAAGUUUUAGAGCUAGAAAUAGCAAGUUAA

AAUAAGGCUAGUCCGUUAUCAACUUGAAAAAGUGGCACCGAGUCGGUGCU

UUU*U*U*U (5'-3')

In the notation of the sequence, in the description of the sequence, U represents uridine, C represents cytidine, A represents adenosine, or G represents guanosine. The symbol between nucleotides indicates that the phosphate bond connecting the nucleotides is phosphorothioate.

The RNA was synthesized from the 3'-side to the 5'-side based on a phosphoramidite method using a nucleic acid synthesizer (AKTA oligopilot plus 100, GE Healthcare). The synthesis was carried out on a 63 μmol scale. In addition, the synthesis was performed using, as RNA amidites, uridine EMM amidite (described in Example 2 of WO 2013/027843 A), cytidine EMM amidite (described in Example 3 of WO 2013/027843 A), adenosine EMM amidite (described in Example 4 of WO 2013/027843 A), and guanosine EMM amidite (described in Example 5 of WO 2013/027843 A) of the following formulae respectively, using porous glass as a solid support, using a dichloroacetic acid toluene solution as a deblocking solution, using 5-benzylthio-1H-tetrazole as a condensing agent, using an iodine solution as an oxidizing agent, using 3-amino-1,2,4-dithiazole-5-thione as a sulfurizing agent, and using a phenoxy acetic anhydride solution and an N-methylimidazole solution as capping solutions. After completion of the nucleic acid elongation, the cyanoethyl protecting group of the phosphate moiety was selectively deprotected by allowing a diethylamine solution to act on the nucleic acid on the support. Here, EMM is an abbreviation of a (2-cyanoethoxy)methoxymethyl group.

[Chemical Formula 7]

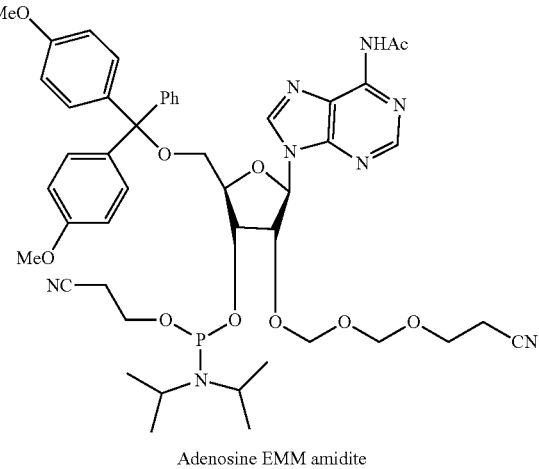

Adenosine EMM amidite

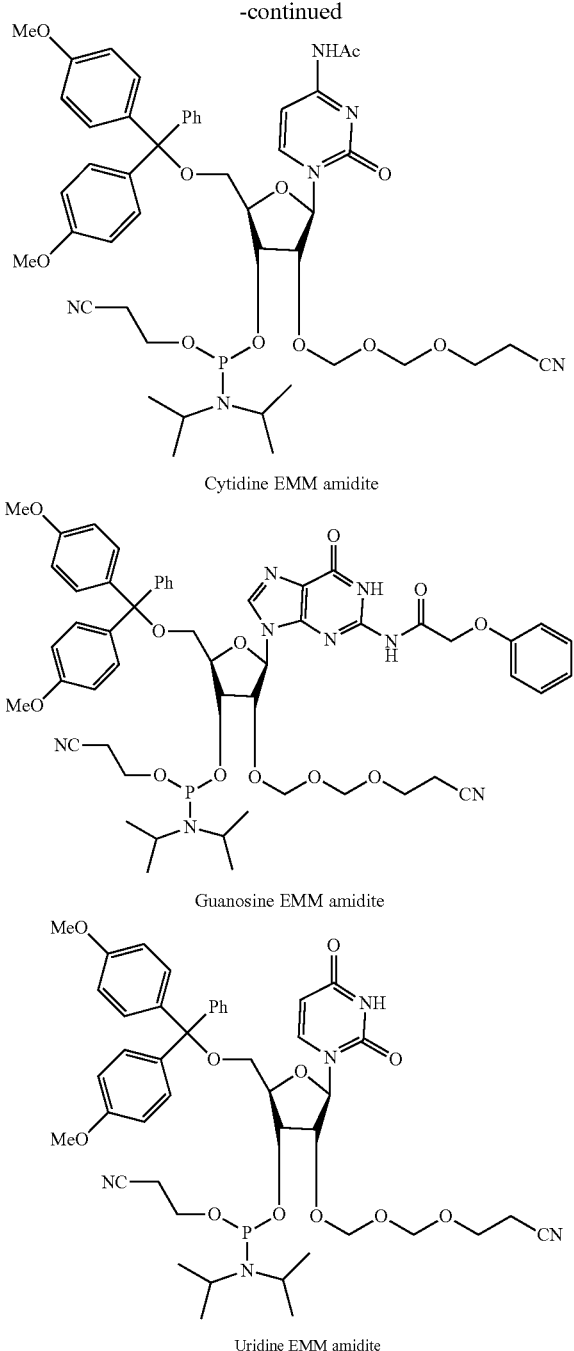

Cytidine EMM amidite

Guanosine EMM amidite

Uridine EMM amidite

Cleavage from the solid support and deprotection after solid-phase synthesis were performed according to the method described in WO 2013/027843 A. Specifically, an aqueous ammonia solution and ethanol were added, and the resulting mixture was allowed to stand for a while, and then the solid support was filtrated, and the solvent was distilled off. Thereafter, deprotection of the hydroxy group was performed using tetrabutylammonium fluoride. The obtained RNA was dissolved at a desired concentration using distilled water for injection.

Preparative Purification of RNA

The synthesized RNA was purified by column chromatography under the conditions of the following Table 2. Before purification, the mobile phase A was passed through the column at a flow rate of 4.7 mL/min for 12.5 minutes, and then the sample was added. The eluted solution of retention time from 94.2 minutes to 95.8 minutes was fractionated, and the obtained solution was analyzed by HPLC. The purity was calculated by the method described in the measurement method 1. As a result, the purity of RNA in the fraction was 94%.

TABLE 2

| | |
|---|---|
| Apparatus | AKTA purifier 100 (manufactured by GE Health Care) |
| Detector | UV 260 nm |
| Column | Triart C18, manufactured by YMC 10 mm × 250 mm, 10 μm |
| Separation mode | Reverse-phase chromatography |
| Column temperature | 60° C. |
| Flow rate | 4.7 mL/min |
| Mobile phase A | 100 mM aqueous dibutylammonium acetate solution (pH 7.0) |
| Mobile phase B | Acetonitrile |
| Fraction width | 3.9 mL |
| Gradient condition | B conc. 0%(0 min)-30%(12.5 min)-40%(95.8 min)-100%(95.9 min)-100%(104 min) |

Confirmation of Storage Stability of Fractionated Solution

Example 1

An amount of 0.5 mL of the solution of the fraction containing RNA preparatively purified in Reference Example 1 was placed in a 10 mL glass headspace vial (GL Sciences Inc.), and the headspace vial was sealed with a septum and a crimp cap (GL Sciences Inc.). Further, a needle for blowing nitrogen from a nitrogen cylinder into the sealed system, a needle for removing the blown nitrogen, and a measurement needle of an oxygen meter were pierced into the septum. Then, nitrogen was allowed to flow in the system, thereby replacing the atmosphere in the system with nitrogen to give an oxygen concentration in the atmosphere of 0.0%. Here, the oxygen concentration was measured by the method described in the measurement method 2. Further, the glass headspace vial containing the fractionated solution was placed in an incubator (KENIS, Ltd.) whose temperature was adjusted to 60° C., and allowed to stand for 8 hours. After the standing, the headspace vial was taken out of the incubator, and cooled to room temperature. The purity of RNA was calculated by the method described in the measurement method 1, and found to be 83%.

Example 2

An amount of 0.5 mL of the solution of the fraction containing RNA preparatively purified in Reference Example 1 was placed in a 10 mL glass headspace vial (GL Sciences Inc.), and the headspace vial was sealed with a septum and a crimp cap (GL Sciences Inc.). Further, a needle for blowing nitrogen from a nitrogen cylinder into the sealed system, a needle for removing the blown nitrogen, and a measurement needle of an oxygen meter were pierced into the septum. Then, nitrogen was allowed to flow in the system, thereby replacing the atmosphere with nitrogen to give an oxygen concentration in the atmosphere of 2.1%. Here, the oxygen concentration was measured by the method described in the measurement method 2. Further, the glass headspace vial containing the fractionated solution was placed in an incubator (KENIS, Ltd.) whose temperature was adjusted to 60° C., and allowed to stand for 8 hours.

After the standing, the headspace vial was taken out of the incubator, and cooled to room temperature. The purity of RNA was calculated by the method described in the measurement method 1, and found to be 77%.

Example 3

An amount of 0.5 mL of the solution of the fraction containing RNA preparatively purified in Reference Example 1 was placed in a 10 mL glass headspace vial (GL Sciences Inc.), and the headspace vial was sealed with a septum and a crimp cap (GL Sciences Inc.). Further, a needle for blowing nitrogen from a nitrogen cylinder into the sealed system, a needle for removing the blown nitrogen, and a measurement needle of an oxygen meter were pierced into the septum. Then, nitrogen was allowed to flow in the system, thereby replacing the atmosphere with nitrogen to give an oxygen concentration in the atmosphere of 7.3%. Here, the oxygen concentration was measured by the method described in the measurement method 2. Further, the glass headspace vial containing the fractionated solution was placed in an incubator (KENIS, Ltd.) whose temperature was adjusted to 60° C., and allowed to stand for 8 hours. After the standing, the headspace vial was taken out of the incubator, and cooled to room temperature. The purity of RNA was calculated by the method described in the measurement method 1, and found to be 73%.

Comparative Example 1

An amount of 0.5 mL of the solution of the fraction containing RNA preparatively purified in Reference Example 1 was placed in a 10 mL glass headspace vial (GL Sciences Inc.), and the headspace vial was sealed with a septum and a crimp cap (GL Sciences Inc.) without replacing the atmosphere with nitrogen. Further, the glass headspace vial containing the fractionated solution was placed in an incubator (KENIS, Ltd.) whose temperature was adjusted to 60° C., and allowed to stand for 8 hours. After the standing, the headspace vial was taken out of the incubator, and cooled to room temperature. Then, the purity of RNA in the fraction was calculated by the method described in the measurement method 1, and found to be 60%.

TABLE 3

| | $O_2$ concentration [%] | HPLC measurement purity[1] | Retention rate of nucleic acid[2] |
|---|---|---|---|
| Example 1 | 0 | 83% | 88% |
| Example 2 | 2.1 | 77% | 82% |
| Example 3 | 7.3 | 73% | 77% |
| Comparative Example 1 | 20.9 | 60% | 64% |

[1]Purity (%) of nucleic acid measured by HPLC after standing and storing nucleic acid (RNA) preparatively purified in Reference Example 1 at 60° C. for 8 hours under predertmined oxygen concentration conditions
[2]Retention rate (%) of nucleic acid = HPLC purity of nucleic acid after storage/purity of nucleic acid in preparative purification of Reference Example 2

Recovery of RNA from Stored Fractionated Solution

Example 4

In Example 1, the oxygen concentration in the atmosphere was set to 0.0%, and 0.4 mL of the solution left to stand for 8 hours was placed in a 15 mL polypropylene conical tube (Corning Incorporated), and 0.2 mL of an aqueous sodium acetate solution (3 M, pH=5.2) and 1.2 mL of ethanol were added thereto. The resulting slurry solution was centrifuged at 3,000 g at 25° C. for 10 minutes, and the supernatant was removed. Subsequently, 1 mL of a 70% aqueous ethanol solution was added to the precipitate, and the operation of centrifuging at 3,000 g and 25° C. for 10 minutes and removing the supernatant was repeated twice, to thereby obtain RNA as a precipitate. The obtained RNA was dissolved in 0.4 mL of water, and the purity of RNA in the fraction was calculated by the method described in the measurement method 1, and found to be 77%.

Comparative Example 2

In Comparative Example 1, 0.4 mL of the fractionated solution left to stand for 8 hours was placed in a 15 mL polypropylene conical tube (Corning Incorporated), and 0.2 mL of an aqueous sodium acetate solution (3 M, pH =5.2) and 1.2 mL of ethanol were added thereto. The resulting slurry solution was centrifuged at 3,000 g at 25° C. for 10 minutes, and the supernatant was removed. Subsequently, 1 mL of a 70% aqueous ethanol solution was added to the precipitate, and the operation of centrifuging at 3,000 g and 25° C. for 10 minutes and removing the supernatant was repeated twice, to thereby obtain RNA. The obtained RNA was dissolved in 0.4 mL of water, and the purity of RNA in the fraction was calculated by the method described in the measurement method 1, and found to be 64%.

Reference Example 2

Solid-Phase Synthesis of RNA by Amidite Method

An RNA having the following nucleic acid sequence of II was synthesized. The RNA strand consists of 67 bases in length.

Strand II:
(SEQ ID NO: 2)
Am*Gm*Cm*AmUmAmGmCAAGUUAmAAAUAAGGmC*U*AmG*U*C*CmGU

UAUCAAmCmUmUmGmAmAmAmAmGmUmGGCACmCmGmAGUCGGmUmGm

Cm*Um*Um*U (5'-3')

In the notation of the sequence, the symbol * between nucleotides indicates that the phosphate bond connecting the nucleotides is phosphorothioate. The alphabets Am, Um, Cm, and Gm represent nucleotides in which a 2'-hydroxy group is substituted with a methoxy group. The RNA was synthesized from the 3'-side to the 5'-side based on a phosphoramidite method using a nucleic acid synthesizer (AKTA oligopilot plus 100, GE Healthcare). The synthesis was carried out on a 53 μmol scale. In addition, the synthesis was performed using, as RNA amidites, uridine EMM amidite (described in Example 2 of WO 2013/027843 A), cytidine EMM amidite (described in Example 3 of WO 2013/027843 A), adenosine EMM amidite (described in Example 4 of WO 2013/027843 A), and guanosine EMM amidite (described in Example 5 of WO 2013/027843 A), and uridine 2'OMe amidite, cytidine 2'OMe amidite, adenosine 2'OMe amidite, and guanosine 2'OMe amidite of the following formulae, respectively, using porous glass as a solid support, using a dichloroacetic acid toluene solution as a deblocking solution, using 5-benzylthio-1H-tetrazole as a condensing agent, using an iodine solution as an oxidizing agent, using 3-amino-1,2,4-dithiazole-5-thione as a sulfurizing agent, and using a phenoxy acetic anhydride solution and an N-methylimidazole solution as capping solutions. After completion of the nucleic acid elongation, the cyanoethyl protecting group of the phosphate moiety was selectively deprotected by allowing a diethylamine solution to act on the nucleic acid on the support. Here, EMM is an abbreviation of a (2-cyanoethoxy)methoxymethyl group.

[Chemical Formula 8]

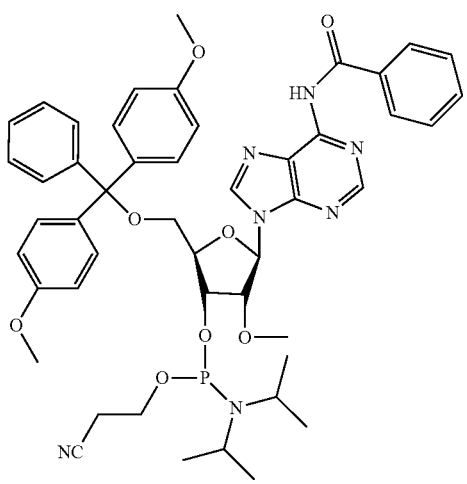

Adenosine 2′OMe amidite

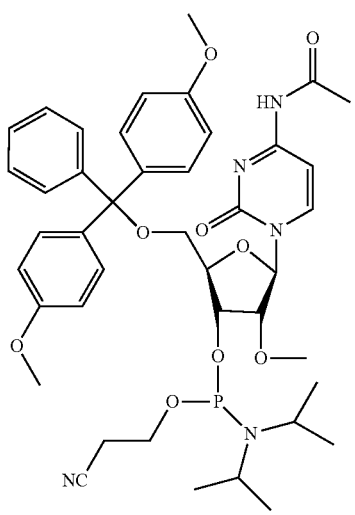

Cytidine 2′OMe amidite

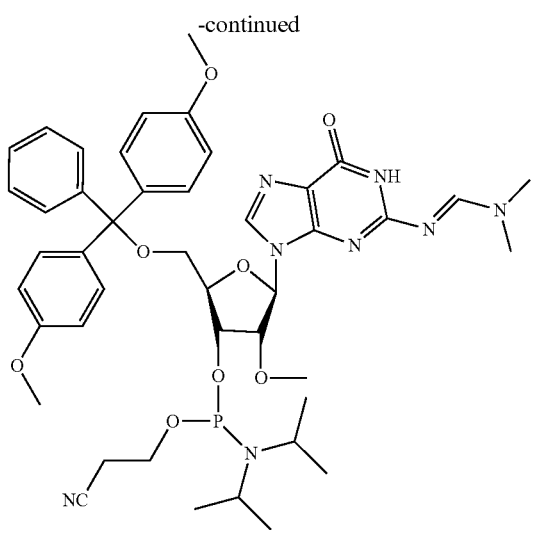

Guanosine 2′OMe amidite

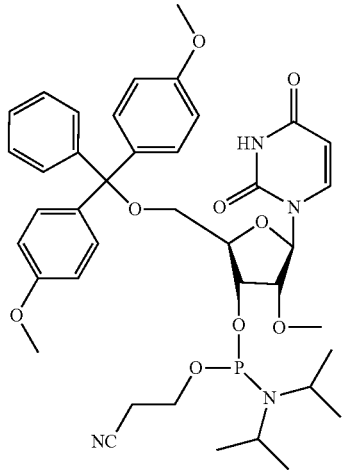

Uridine 2′OMe amidite

Cleavage from the solid support and deprotection after solid-phase synthesis were performed according to the method described in WO 2013/027843 A. Specifically, an aqueous ammonia solution and ethanol were added, and the resulting mixture was allowed to stand for a while, and then the solid support was filtrated, and the solvent was distilled off. Thereafter, deprotection of the hydroxy group was performed using tetrabutylammonium fluoride. The obtained RNA was dissolved at a desired concentration using distilled water for injection.

Preparative Purification of RNA

Purification was performed by column chromatography under the conditions of the following Table 4. Before purification, the mobile phase A was passed through the column at a flow rate of 4.7 mL/min for 12.5 minutes, and then the sample was added. The eluted solution of retention time from 66.7 minutes to 70.9 minutes was fractionated, and the obtained solution was analyzed by HPLC. The purity was calculated by the method described in the measurement method 1. As a result, the purity was 94%. Experiments of the following Examples and Comparative Examples were performed using the RNA solution that was preparatively purified.

TABLE 4

| | |
|---|---|
| Apparatus | AKTA purifier 100 (manufactured by GE Health care) |
| Detector | UV 260 nm |
| Column | Triart C18, manufactured by YMC 10 mm × 250 mm, 10 μm |
| Separation mode | Reverse-phase chromatography |
| Column temperature | 60° C. |
| Flow rate | 4.7 mL/min |
| Mobile phase A | 100 mM aqueous dibutylammonium acetate solution (pH 7.0) |
| Mobile phase B | Acetonitrile (containing 10% methanol (v/v)) |
| Fraction width | 3.9 mL |
| Gradient condition | B conc. 0%(0 min)-35%(12.5 min)-50%(137.6 min)-100%(137.7 min)-100%(145.9 min) |

Confirmation of Storage Stability of Fractionated Solution

Example 5

An amount of 0.5 mL of the solution of the fraction containing RNA preparatively purified in Reference Example 2 was placed in a 10 mL glass headspace vial (GL Sciences Inc.), and the headspace vial was sealed with a septum and a crimp cap (GL Sciences Inc.). Further, a needle for blowing nitrogen from a nitrogen cylinder into the sealed system, a needle for removing the blown nitrogen, and a measurement needle of an oxygen meter were pierced into the septum. Then, nitrogen was allowed to flow in the system, thereby replacing the atmosphere in the system with nitrogen to give an oxygen concentration in the atmosphere of 0.0%. Here, the oxygen concentration was measured by the method described in the measurement method 2. Further, the glass headspace vial containing the fractionated solution was placed in an incubator (KENIS, Ltd.) whose temperature was adjusted to 60° C., and allowed to stand for 8 hours. After the standing, the headspace vial was taken out of the incubator, and cooled to room temperature. The purity of RNA was calculated by the method described in the measurement method 1, and found to be 87°.

Example 6

An amount of 0.5 mL of the solution of the fraction containing RNA preparatively purified in Reference Example 2 was placed in a 10 mL glass headspace vial (GL Sciences Inc.), and the headspace vial was sealed with a septum and a crimp cap (GL Sciences Inc.). Further, a needle for blowing nitrogen from a nitrogen cylinder into the sealed system, a needle for removing the blown nitrogen, and a measurement needle of an oxygen meter were pierced into the septum. Then, nitrogen was allowed to flow in the system, thereby replacing the atmosphere with nitrogen to give an oxygen concentration in the atmosphere of 2.1%. Here, the oxygen concentration was measured by the method described in the measurement method 2. Further, the glass headspace vial containing the fractionated solution was placed in an incubator (KENIS, Ltd.) whose temperature was adjusted to 60° C., and allowed to stand for 8 hours. After the standing, the headspace vial was taken out of the incubator, and cooled to room temperature. The purity of RNA was calculated by the method described in the measurement method 1, and found to be 84%.

Example 7

An amount of 0.5 mL of the solution of the fraction containing RNA preparatively purified in Reference Example 2 was placed in a 10 mL glass headspace vial (GL Sciences Inc.), and the headspace vial was sealed with a septum and a crimp cap (GL Sciences Inc.). Further, a needle for blowing nitrogen from a nitrogen cylinder into the sealed system, a needle for removing the blown nitrogen, and a measurement needle of an oxygen meter were pierced into the septum. Then, nitrogen was allowed to flow in the system, thereby replacing the atmosphere with nitrogen to give an oxygen concentration in the atmosphere of 4.5%. Here, the oxygen concentration was measured by the method described in the measurement method 2. Further, the glass headspace vial containing the fractionated solution was placed in an incubator (KENIS, Ltd.) whose temperature was adjusted to 60° C., and allowed to stand for 8 hours. After the standing, the headspace vial was taken out of the incubator, and cooled to room temperature. The purity of RNA was calculated by the method described in the measurement method 1, and found to be 83%.

Comparative Example 3

An amount of 0.5 mL of the solution of the fraction containing RNA preparatively purified in Reference Example 2 was placed in a 10 mL glass headspace vial (GL Sciences Inc.), and the headspace vial was sealed with a septum and a crimp cap (GL Sciences Inc.) without replacing the atmosphere with nitrogen. Further, the glass headspace vial containing the fractionated solution was placed in an incubator (KENIS, Ltd.) whose temperature was adjusted to 60° C., and allowed to stand for 8 hours. After the standing, the headspace vial was taken out of the incubator, and cooled to room temperature. Then, the purity of RNA in the fraction was calculated by the method described in the measurement method 1, and found to be 79%.

TABLE 5

| | $O_2$ concentration [%] | HPLC measurement purity[1] | Retention rate of nucleic acid[2] |
|---|---|---|---|
| Example 5 | 0 | 87% | 92% |
| Example 6 | 2.1 | 84% | 89% |
| Example 7 | 4.5 | 83% | 88% |
| Comparative Example 3 | 20.9 | 79% | 84% |

[1]Purity (%) of nucleic acid measured by HPLC after standing and storing nucleic acid (RNA) preparatively purified in Reference Example 2 at 60° C. for 8 hours under predetermined oxygen concentrated conditions
[2]Retention rate (%) of nucleic acid = HPLC purity of nucleic acid after storage/purity of nucleic acid in preparative purification of Reference Example 2

INDUSTRIAL APPLICABILITY

A nucleic acid oligomer having a phosphorothioate bond in the eluted fraction of reverse-phase chromatography can be stabilized, and a purified nucleic acid oligomer having a phosphorothioate bond (for example, RNA) can be efficiently produced.

[Sequence Listing Free Text]

SEQ ID NOs: 1 and 2 in the Sequence Listing represent the base sequences of oligonucleotides produced according to the production method of the present invention.

The invention claimed is:

1. A method for stabilizing a nucleic acid oligomer, comprising:

setting an atmosphere in contact with a solution containing a nucleic acid oligomer of Formula (1) to an inert gas atmosphere by replacing the atmosphere with the inert gas in a container to obtain an oxygen concentration of 10% or less by volume, the nucleic acid oligomer being an eluted fraction obtained by reverse-phase column chromatography:

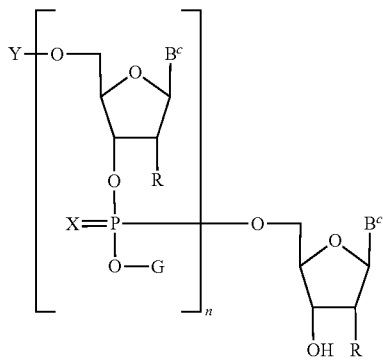

(1)

wherein the nucleic acid oligomer of Formula (1) has one or more phosphorothioate bonds, $B^C$ is the same or different and each independently is a nucleobase, R is the same or different and each independently is a hydrogen atom, a fluorine atom, or an OQ group, Q is the same or different and each independently is a hydrogen atom, a methyl group, a 2-methoxyethyl group, a methylene group bonded to a carbon atom at the 4-position of the same ribose, an ethylene group bonded to a carbon atom at the 4'-position of the same ribose, or an ethylidene group bonded to a carbon atom at the 4'-position of the same ribose, X is the same or different and each independently is an oxygen atom or a sulfur atom, Y is a hydrogen atom or a protecting group of a hydroxy group, G is an ammonium ion, an alkylammonium ion, an alkali metal ion, a hydrogen ion, or a hydroxyalkylammonium ion, n is an integer satisfying $60 \leq n$, and X is the sulfur atom for up to 20% of n.

2. A method for producing a stabilized purified nucleic acid oligomer solution, the method comprising:

subjecting a crude product of a nucleic acid oligomer of Formula (1) in claim 1 produced by a phosphoramidite method to reverse-phase column chromatography, to obtain a purified eluted fraction containing the nucleic acid oligomer of Formula (1); and stabilizing the nucleic acid oligomer by the method of claim 1.

3. A method for producing a purified nucleic acid oligomer, the method comprising:

producing a stabilized purified nucleic acid oligomer solution by the method of claim 2; and isolating the purified nucleic acid oligomer from the stabilized purified nucleic acid oligomer solution.

4. The method according to claim 1, wherein the oxygen concentration is 5% or less by volume.

5. The method according to claim 1, wherein the oxygen concentration is 2.5% or less by volume.

6. The method according to claim 2, wherein the reverse-phase column chromatography includes a mobile phase comprising at least one ammonium salt selected from the group consisting of a monoalkylammonium salt and a dialkylammonium salt.

7. The method according to claim 2, wherein the reverse-phase column chromatography includes a mobile phase comprising at least one dialkylammonium salt.

8. The method according to claim 2, wherein the reverse-phase column chromatography includes a mobile phase comprising at least one water-soluble organic solvent selected from the group consisting of an alcohol-based water-soluble organic solvent and a nitrile-based water-soluble organic solvent.

9. The method according to claim 3, wherein the isolating includes mixing the stabilized purified nucleic acid oligomer solution with a C1-C4 organic solvent having at least one oxygen atom, and precipitating the purified nucleic acid oligomer.

10. The method according to claim 1, wherein R is each independently a hydroxy group or a methoxy group.

11. The method according to claim 1, wherein R is a hydroxy group.

* * * * *